(12) United States Patent
Findlater et al.

(10) Patent No.: US 7,801,384 B2
(45) Date of Patent: Sep. 21, 2010

(54) CMOS IMAGE SENSORS

(75) Inventors: Keith Findlater, Edinburgh (GB); Angelo Bosco, Giarre (IT)

(73) Assignee: STMicroelectronics Ltd., Marlow - Buckinghamshire (GB)

( * ) Notice: Subject to any disclaimer, the term of this patent is extended or adjusted under 35 U.S.C. 154(b) by 1197 days.

(21) Appl. No.: 10/841,947

(22) Filed: May 7, 2004

(65) Prior Publication Data
US 2005/0104981 A1 May 19, 2005

(30) Foreign Application Priority Data
May 8, 2003 (EP) ................................. 03252872

(51) Int. Cl.
*G06K 9/40* (2006.01)
(52) U.S. Cl. ..................................... 382/254
(58) Field of Classification Search ................. 382/254
See application file for complete search history.

(56) References Cited

U.S. PATENT DOCUMENTS

| | | | | |
|---|---|---|---|---|
| 4,392,157 A | * | 7/1983 | Garcia et al. ................. | 348/243 |
| 5,572,608 A | * | 11/1996 | Edgar .......................... | 382/321 |
| 5,604,601 A | * | 2/1997 | Edgar et al. .................. | 358/302 |
| 5,771,317 A | * | 6/1998 | Edgar .......................... | 382/260 |
| 6,061,092 A | | 5/2000 | Bakhle et al. ................ | 348/243 |
| 6,101,287 A | * | 8/2000 | Corum et al. ................ | 382/274 |
| 6,166,768 A | * | 12/2000 | Fossum et al. ............... | 348/308 |
| 6,418,241 B1 | * | 7/2002 | Schreiner ..................... | 382/263 |
| 6,476,864 B1 | * | 11/2002 | Borg et al. ................... | 348/245 |
| 6,606,122 B1 | * | 8/2003 | Shaw et al. .................. | 348/302 |
| 6,670,598 B1 | * | 12/2003 | Hosier et al. ............. | 250/214 A |
| 2002/0051067 A1 | * | 5/2002 | Henderson et al. .......... | 348/241 |
| 2003/0193597 A1 | * | 10/2003 | Fossum et al. ............... | 348/308 |

FOREIGN PATENT DOCUMENTS

GB          2375252          11/2002

* cited by examiner

*Primary Examiner*—Bhavesh M Mehta
*Assistant Examiner*—David P Rashid
(74) *Attorney, Agent, or Firm*—Lisa K. Jorgenson; Allen, Dyer, Doppelt, Milbrath & Gilchrist, P.A.

(57) ABSTRACT

An image sensor array of active pixel elements is arranged in rows and columns. Each column has an output circuit for reading out pixel image signals. The output circuit includes a pair of sample capacitors, a switching circuit operable based upon pixel switches for applying pixel voltages to the pair of sample capacitors. At least one optically masked pixel is provided so that output image signals obtained therefrom represent substantially only the column fixed pattern noise (FPN). An image processing circuit records the column FPN for each column from the optically masked pixels, records the image signal from the sensor array of active pixels, and subtracts the column FPN column-wise from the image signal.

25 Claims, 5 Drawing Sheets

(A) PIXEL RESPONSES WITH POSITIVE AND NEGATIVE FPN

CMOS IMAGE SENSORS

FIELD OF THE INVENTION

The present invention relates to solid-state image sensors using CMOS technology.

BACKGROUND OF THE INVENTION

A common architecture used in CMOS image sensors is the column parallel analog-to-digital converter (ADC). In image sensors comprising a column parallel ADC, an analog-to-digital conversion element is provided per column of pixels in the imaging array. This architecture has many advantages, such as the low bandwidth requirements of each individual converter element, which implies low noise and low power, and scalability to large array sizes due to the parallel nature of the conversion process.

While designed to be identical, the manufacturing tolerances on each comparator within the ADC mean that each one has a different offset. Thus, for an identical input signal each comparator will latch and store a slightly different digital code. Therefore, the comparator offsets of the column parallel ADC produce a column-wise error in the image. At high gain conditions, when the comparator offset becomes more significant compared to image signal levels, the error comes through as visible vertical lines in the image. This is normally termed vertical fixed pattern noise (VFPN), or fixed pattern noise (FPN), and is extremely annoying to the eye.

A conventional method of removing FPN is to subtract a second dark image data frame from the image data frame. This removes vertical FPN and also pixel level FPN due to pixel offsets and dark current. Although this system is effective in removing FPN, it requires an optical shutter and a frame store, which is an extra cost.

SUMMARY OF THE INVENTION

An object of the present invention to provide improved techniques for removing fixed pattern noise (FPN) in CMOS solid-state image sensors while mitigating the disadvantages referred to above.

This and other objects, advantages and features in accordance with the present invention are provided by a method for correcting column fixed pattern noise (FPN) in pixel image signals from an image sensor comprising an array of active pixel elements arranged in rows and columns, with at least one of the rows comprising optically masked pixels so that output image signals obtained therefrom substantially represent a column FPN. A respective output circuit is connected to each column of the array of active pixels for reading the pixel image signals therefrom. Each output circuit may comprises a pair of sampling capacitors, and a sampling switch for applying pixel voltages to the pair of sampling capacitors. The method comprises recording the column FPN for each column from the at least one row of optically masked pixels, recording the pixel image signals from the array of active pixels, and subtracting the column FPN column-wise from the pixel image signals.

Another aspect of the present invention is directed to an image sensor comprising an array of active pixel elements arranged in rows and columns, with at least one of the rows comprising optically masked pixels so that output image signals obtained therefrom substantially represent a column fixed pattern noise (FPN). A respective output circuit may be connected to each column of the array of active pixels for reading pixel image signals therefrom, with each output circuit comprising a pair of sampling capacitors, and a sampling switch for applying pixel voltages to the pair of sampling capacitors. The image sensor may further comprise an image processing circuit for recording the column FPN for each column from the at least one row of optically masked pixels, recording the pixel image signals from the array of active pixels, and subtracting the column FPN column-wise from the pixel image signals.

Preferred features and advantages of the invention will be apparent from the claims and the following description.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENTS

Figure 1:
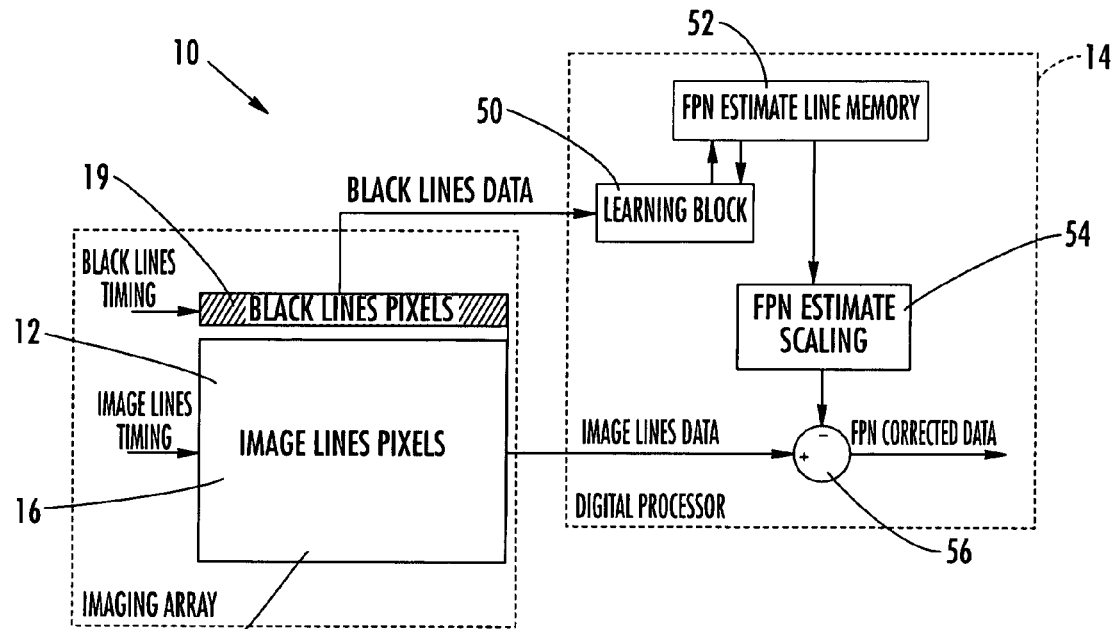
FIG. 1 is a schematic diagram of part of an image sensor in accordance with the present invention.

Referring to FIG. 1, an image sensor 10 comprises an imaging array 12 for acquiring a 2-dimensional image and converting it into a digital data stream, and a digital processing block 14 for removal of fixed pattern noise (FPN) from the digital data stream. Although not illustrated in FIG. 1, other signal processing may be performed by the image sensor 10, such as color interpolation, color correction, noise reduction or data compression. The signal processing may alternatively be performed by one or more external devices to the image sensor 10, or implemented as a software function.

The imaging array 12 comprises an array of active pixel elements 16 arranged in rows and columns. At least one of the rows of active pixel elements 16 are dummy or black pixels 19 which are electrically identical to standard image pixels 17, but are not used to obtain image data. The black pixels 19 are optically masked pixels such that output image signals obtained from the optically masked pixels 19 represent substantially only the column FPN.

Figure 2:
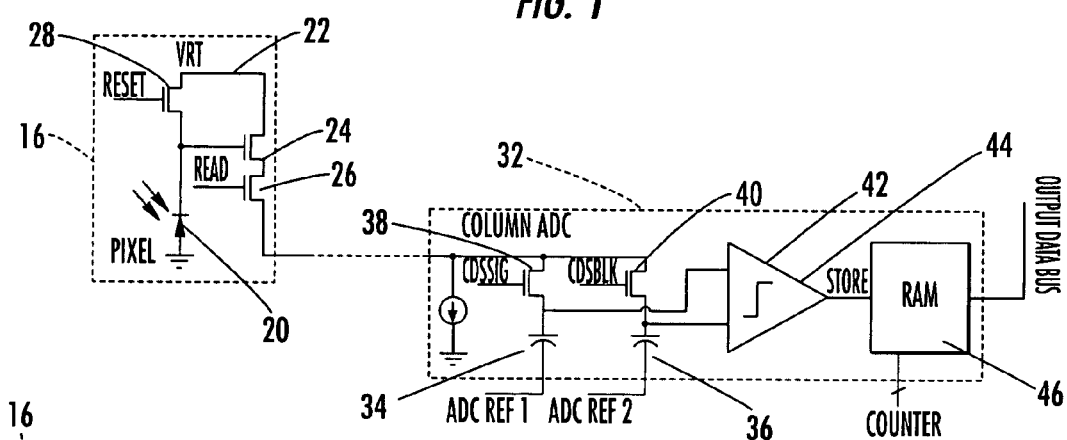
FIG. 2 is a schematic diagram of part of an image sensor of FIG. 1 comprising a three-transistor (non-pinned photodiode) pixel.
Figure 3:
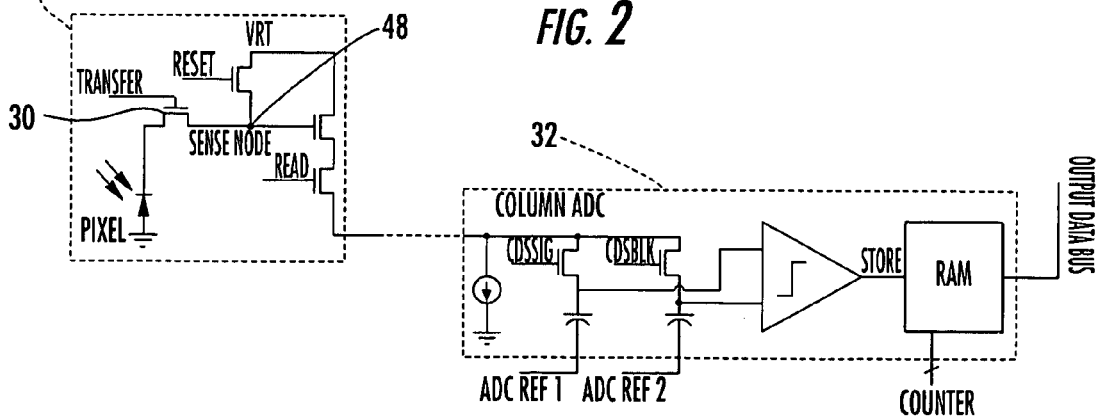
FIG. 3 is a schematic diagram of part of an image sensor of FIG. 1 comprising a four-transistor (pinned photodiode) pixel.

As illustrated in FIGS. 2 and 3, the imaging array 12 may comprise of either three-transistor (non-pinned photodiode) pixels or four-transistor (pinned photodiode) pixels. Each type of pixel comprises a photosensitive diode 20, a reset voltage supply 22, a pair of transistors 24 which forms the upper half of an NMOS source follower structure, the lower transistor of which is a read transistor 26, a reset transistor 28, and in the case of the four-transistor pixel only, a transfer gate 30.

Each column of the array of pixels 16 of the image array 12 has an output circuit 32 for reading out pixel image signals. The output circuit 32 comprises a pair of sample capacitors 34, 36 and a pair of sampling switches 38, 40 (transistors) connected as inputs to a comparator 42 of an analog-to-digital converter (ADC) 44. The output circuit 32 also comprises a random access memory (RAM) 46.

Figure 4:
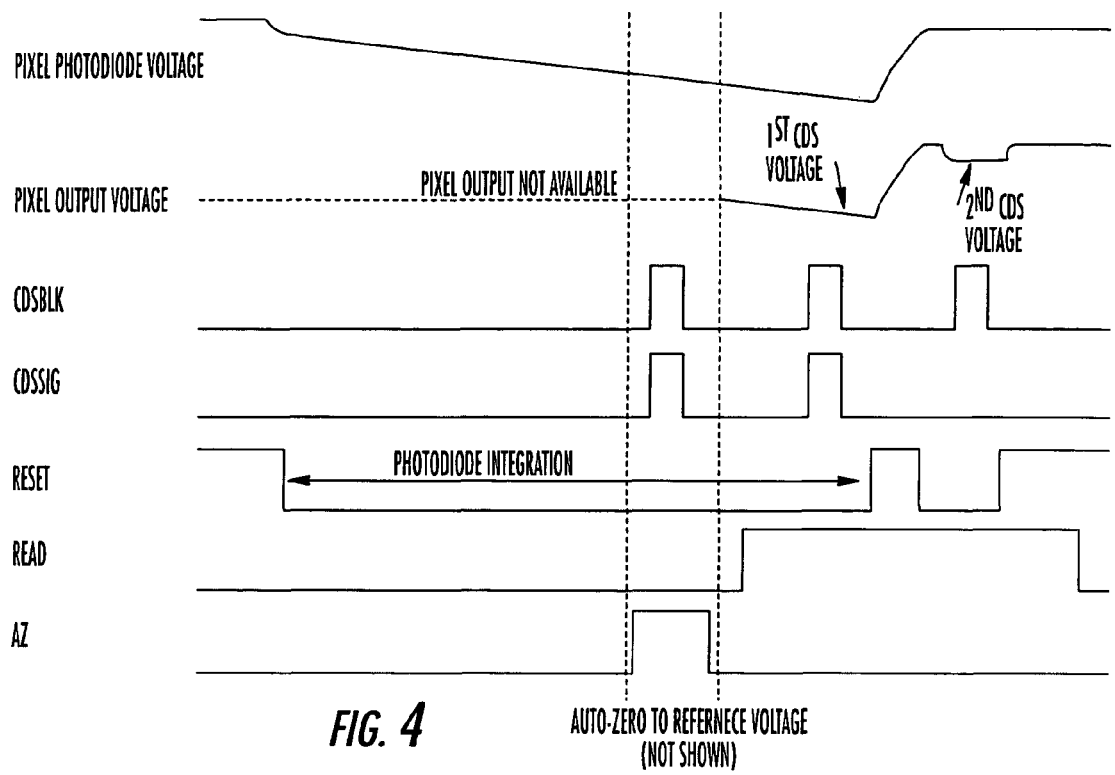
FIG. 4 is a timing diagram illustrating the three-transistor pixel read-out operation of the image pixels of FIG. 1.
Figure 5:
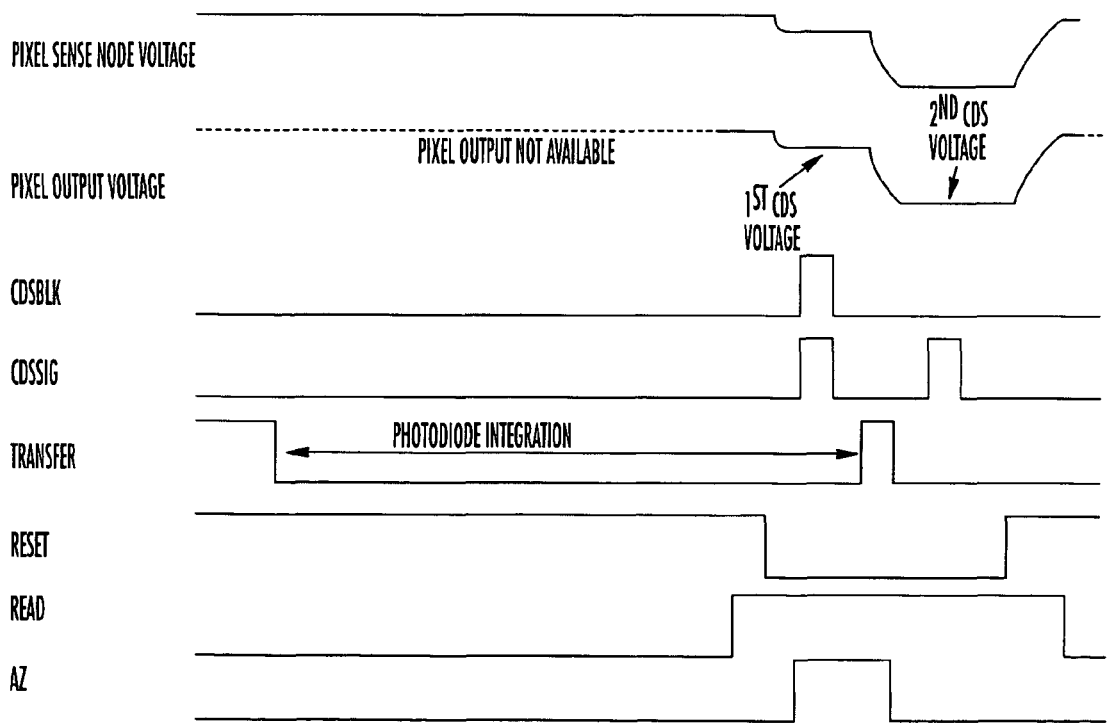
FIG. 5 is a timing diagram illustrating the four-transistor pixel read-out operation of the image pixels of FIG. 1.

FIGS. 4 and 5 illustrate known timing operations for reading-out image signals from three and four-transistor image pixels 17 respectively. With reference to FIG. 4, the three-transistor image pixel 17 is initially reset to the reference voltage by pulsing reset transistor 28 high. When the pixel 17 is released from reset, the pixel 17 begins to integrate photo-generated current on the capacitance of the photodiode 20. Prior to the detection of the light signal, the comparator 42 of the ADC 44 is auto-zeroed. This reduces the offset of the comparator, but does not eliminate it completely.

The light signal is detected after a certain exposure time. The read transistor 26 pulses high and the first and second sampling switches 38, 40 sample the pixel voltage onto the first and second sampling capacitors 34, 36. The pixel voltage includes the integrated light signal voltage output of the pixel 17, plus the pixel offsets and the noise of the reset voltage before the integration.

The reset transistor 28 is then pulsed high for a second time. When the pixel 17 is released from reset, the second sampling switch 40 samples this reset voltage onto the second sampling capacitor 36. The reset sample voltage includes the reset voltage of the photodiode 20, plus the pixel offsets (same as that of photodiode voltage) and the noise of this current reset (different from reset noise of photodiode voltage).

The comparator 42 takes the difference of the pixel voltage and the reset voltage, which produces the integrated light signal voltage and the sum of the two reset noise voltages. The ADC 44 then converts this voltage to digital code prior to the beginning of the next cycle.

With reference to FIG. 5, the four-transistor pixel 17 is initially reset to the reference voltage 22 by a pulsing reset transistor 28 and a transfer gate 30. When the transfer gate 30 is released the pixel 17 begins to integrate photogenerated current on the capacitance of the photodiode 20. The light signal is detected after a certain exposure time. Prior to the detection of the light signal, the pixel 17 is released from reset by setting reset transistor 28 low.

The read transistor 26 is set high and the pixel reset voltage is sampled onto the first and second sampling capacitors 38, 40. At this point and prior to the detection of the light signal, the comparator 42 of the ADC 44 is auto-zeroed.

The transfer gate 30 is then pulsed high to transfer the photogenerated charge collected during integration to the sense node 48. When the transfer gate 30 is released, the first sampling switch 38 samples the pixel voltage onto the first sampling capacitor 34.

The pixel voltage sampled onto the second sampling capacitor 36 includes the reset voltage of the pixel sense node 48, plus the pixel offsets and the noise of the sense node reset.

The pixel voltage sampled onto the first sampling capacitor 34 includes the same reset voltage, noise and pixel offsets as that of the second sampling capacitor 36, plus the integrated light signal voltage output of the pixel 17.

The comparator 42 takes the difference of the photodiode voltages, which produces the integrated light signal voltage.

The offsets and reset noise are cancelled. The ADC 44 then converts this voltage to digital code prior to the beginning of the next cycle.

Figure 6:
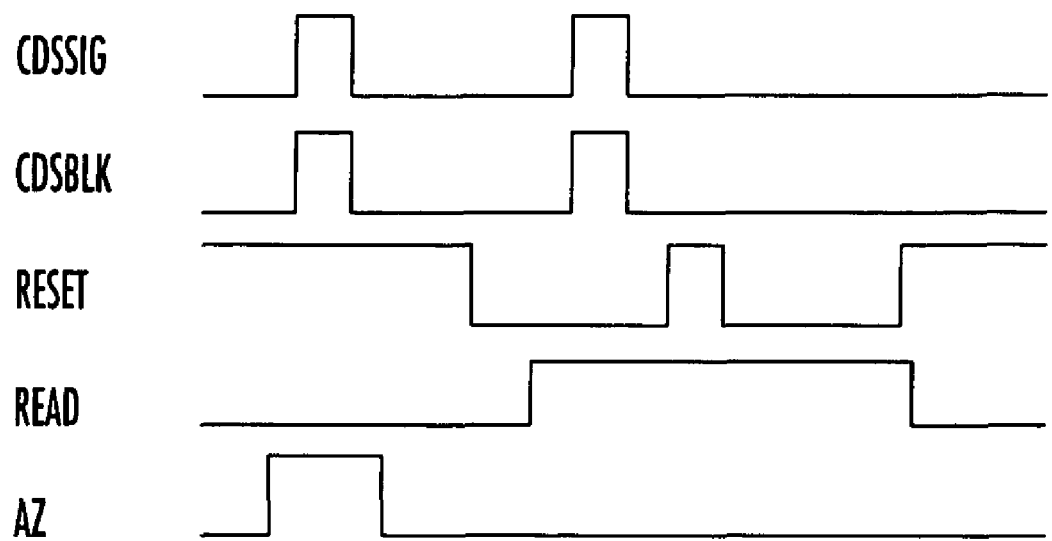
FIG. 6 is a timing diagram illustrating the three-transistor pixel read-out operation of the black pixels of FIG. 1 in accordance with the present invention.
Figure 7:
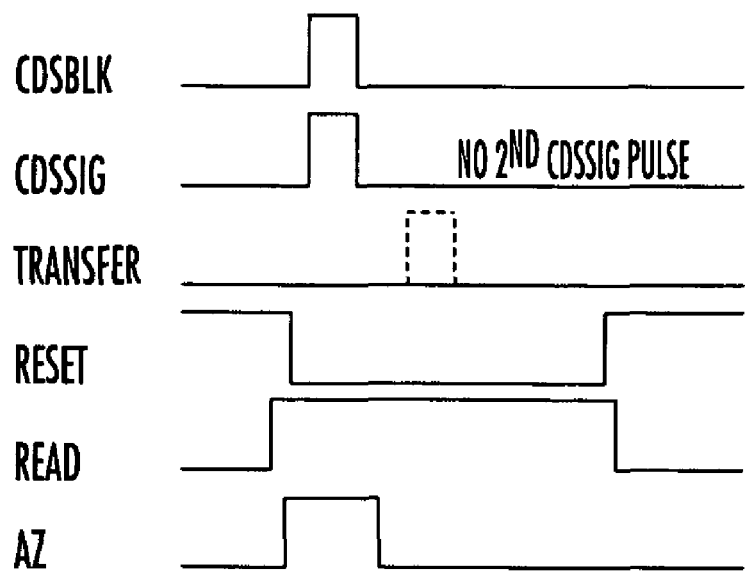
FIG. 7 is a timing diagram illustrating the four-transistor pixel read-out operation of the black pixels of FIG. 1 in accordance with the present invention.

FIGS. 6 and 7 illustrate the timing operations for reading-out the image signals from the three and four-transistor black pixels 19 respectively. Known timing operations used to read-out the image signals from the three and four-transistor black pixels 19 have conventionally been identical to those detailed above for the image pixels 17, except that the black pixels 19 are always kept in minimum exposure.

Unfortunately, with these timings, the estimate of FPN is corrupted by the effects of light accumulation, reset noise and dark current. The ADC 44 of the output circuit 32 is operated at maximum analog gain on the black pixels to convert the data to digital with maximum accuracy.

FIG. 6 illustrates the timing operation used to read-out the image signals of the three-transistor black pixels 19 in accordance with the present invention. The timing operation is similar to that illustrated in FIG. 4, except the black pixel 19 is kept in minimum exposure and there is no third pulse of the second sampling switch 40. By removing the third pulse of the second sampling switch 40, the same signal voltage is sampled onto both sampling capacitors 34, 36 by the first and second sampling switches 38, 40 respectively. Thus, any light signal which has accumulated on the black pixel 19 in the exposure time and any noise, reset or otherwise, is cancelled during the analog-to-digital conversion, which is differential.

FIG. 7 illustrates the timing operation used to read-out the image signals of the four-transistor black pixels 19 in accordance with the present invention. Again, the timing operation is similar to that illustrated in FIG. 5, except the black pixel 19 is kept in minimum exposure and there is no second pulse for the first sampling switch 38. By removing the second pulse of the first sampling switch 38, the same signal voltage is sampled onto both sampling capacitors 34, 36 by the first and second sampling switches 38, 40 respectively. Thus, any light signal which has accumulated on the black pixel 19 in the exposure time and any noise, reset or otherwise, is again cancelled during the analog-to-digital conversion.

Therefore, by using these timings for the black pixels 19, black pixel data is obtained which has very low temporal noise, zero light related signal, zero dark current related signal and a common mode ADC input voltage which is equal to that of the image pixels 17. The common mode voltage still contains the effects of any capacitive coupling or charge injection from the falling edge of the reset signal, which should match that of the image pixels 17.

The digital processing block 14 comprises an algorithm for removal of FPN from the digital data stream. The operations of the algorithm are performed in a learning block 50, an FPN estimate line memory block 52, an FPN estimate scaling block 54 and a subtraction block 56 of the digital processing block 14.

The algorithm is configured to only work properly with the timing operations of FIGS. 4 to 7. Also, it is important that the black pixel data is not clipped in any way during the analog-to-digital conversion. The algorithm also requires a knowledge of the analog gain being applied to the image pixels. This allows the estimate of the FPN obtained from the black pixels 19 to be scaled to match the image pixels 17 analog gain.

The first part of the algorithm is the calculation of the mean column-wise FPN from the black pixel data and the updating of the current FPN estimate. At power up or reset, the FPN estimate line memory block 52 is cleared. For each of the column of black pixels the mean of the black pixel data is computed using:

$$B_j = \frac{\sum_{i=0,1,\ldots,n} p_{i,j}}{n},\quad(1)$$

where $B_j$ is the FPN average for column j, i is the pixel in black line i for that column, $p_{i,j}$ is the black pixel data value and n is the number of black lines.

The averaged FPN values for each column of black pixels 19 provides an instant estimate of the FPN. To improve the noise immunity of the algorithm, the averaged FPN values is leaky integrated (digitally low pass filtered) using:

$$E_j[n] = E_j[n-1]\frac{B_j - E_j[n-1]}{2^T},\quad(2)$$

where $E_j$ is the updated estimate of the FPN for the column in question, $E_j[n-1]$ is the old estimate, $B_j$ is the averaged FPN for the current frame, and T is the leaky integrator time constant. There is a trade-off between settling speed (lower T) and noise immunity (higher T).

Equations (1) and (2) can be combined to allow only one line memory to be used in a hardware machine, giving:

$$E_j[n] = E_j[n-1] - 2^{-T}E_j[n-1] + \sum_{i=1,\ldots n} 2^{-T}\frac{p_{i,j}}{n}.\quad(3)$$

In equation (3), the old FPN estimate is scaled by the time constant (first two terms), and then each black pixel data value, scaled by the leaky integrator parameter and divided by the total number of lines, is added to the estimate (summed from i=1 to i=n).

The average of $E_j$ ($\bar{E}$) for all the columns is computed and stored, as it is required for the cancellation part of the algorithm. This can be computed while the last black line's pixel data is added to the estimate.

Following this part of the algorithm, we now have an estimate $E_j$ of the FPN for each column. The FPN estimate here is calculated with maximum analog gain being applied to the ADC 44 of the output circuit 32. The second part of the algorithm is the cancellation of the column-wise FPN in the image signal.

Figure 8:
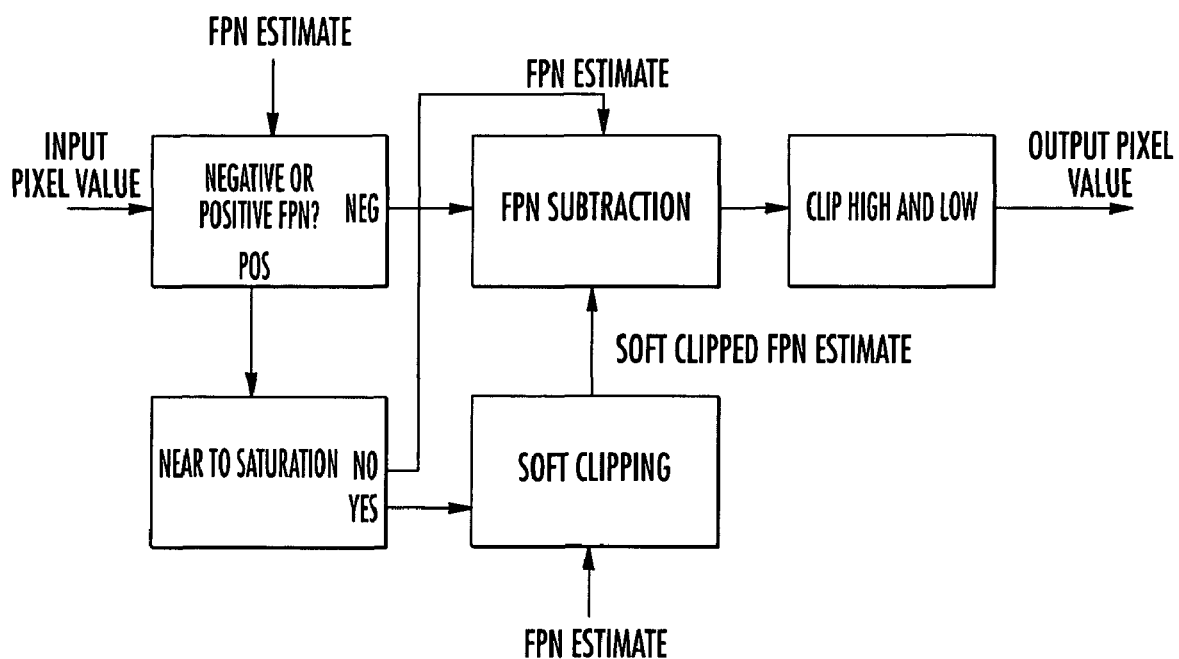
FIG. 8 is a schematic diagram of the operation of the image processing means of FIG. 1.

FIG. 8 illustrates the cancellation operation of the digital processing block 14. For the correction of positive FPN, the input pixel value is first checked to find out if it is close to the saturation value of the ADC 44 defined as (input pixel value) <(ADC saturation−soft clipping threshold). If the pixel value is not near saturation, the FPN is cancelled from the image signal by:

$$o_{i,j} = p_{i,j} - E_j + \bar{E},\quad(4)$$

where $o_{i,j}$ is the output pixel value with FPN corrected for.

If the pixel is close to saturation defined as (input pixel value≧ADC saturation−soft clipping threshold) the subtracted FPN value is scaled when cancelled by:

$$o_{i,j} = p_{i,j} + (\bar{E}-E_j)\times(p_{saturation}-p_{i,j})/k_{sc},\quad(5)$$

where $p_{saturation}$ is the input saturation level of the data to be corrected, and $k_{sc}$ is the soft clipping threshold. As $p_{i,j}$ approaches $p_{saturation}$, the FPN correction value tends to zero.

For the correction of negative FPN, there is no need for soft clipping. The correction is therefore the same as equation (4) above. The resulting pixel voltages above $p_{saturation}$ are clipped to be equal to $p_{saturation}$ and values below zero are clipped to zero.

The mean luminance level of the image is not changed by the algorithm due to the mean FPN correction parameter $\bar{E}$, so there is no interaction with the dark calibration or white balance of the image sensor 10.

Figure 9:
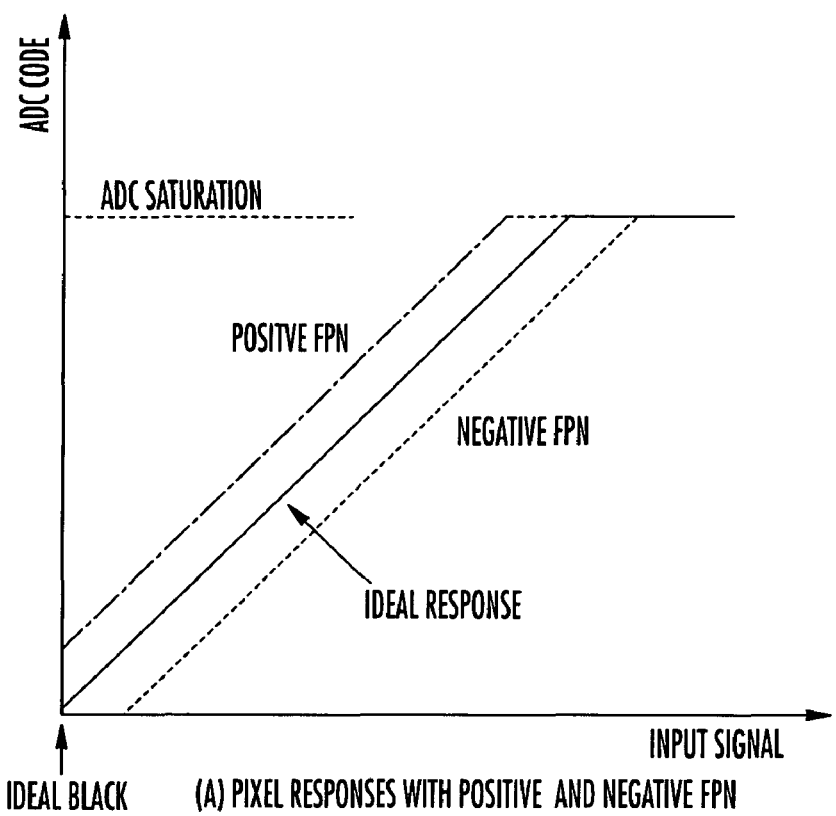
FIG. 9 is a typical pixel signal response with positive and negative FPN.
Figure 10:
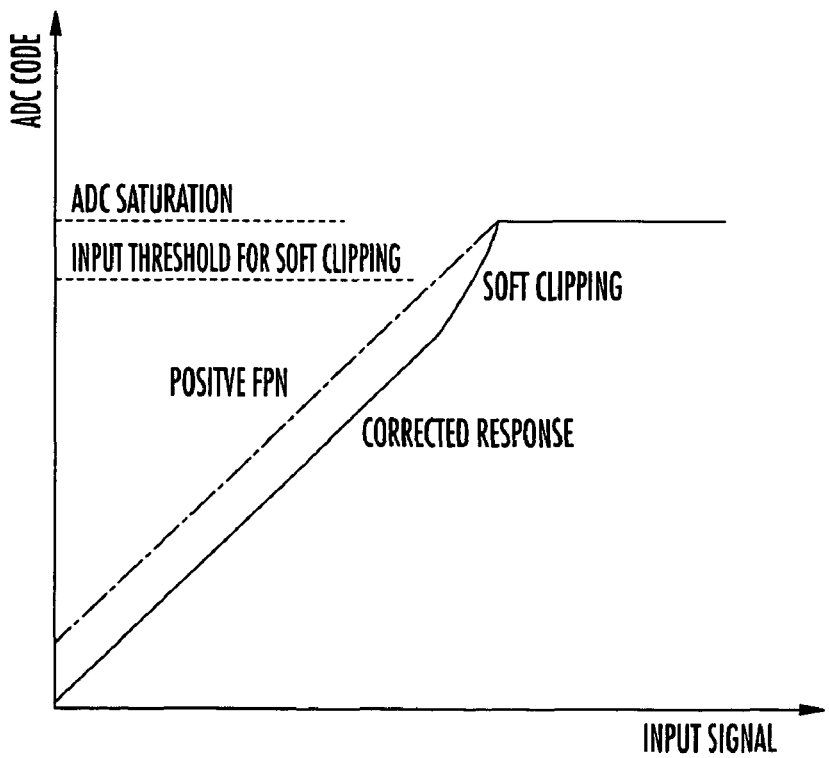
FIG. 10 is a typical pixel signal response of FIG. 9 with soft clipping applied.

With reference to FIGS. 9 and 10, care must be taken when correcting FPN in sections of the image near saturation (or close to saturation). With negative FPN, there is no problem, provided that the corrected data is clipped to the saturation level. However, for positive FPN, a correction to a saturated pixel in the image will pull the pixel value down. As there is no way of knowing whether this pixel would have been saturated had it been FPN free or not, pulling the pixel down from saturation without taking care results in ceiling errors, where FPN is introduced by the correction into saturated sections of the image.

This problem may be avoided by scaling the FPN value subtracted from the pixels as they approach saturation, resulting in a non-linear response (as illustrated in FIG. 10). For a saturated pixel, this means that no correction will be performed. The exact method for soft clipping is that described by equation (5).

Other methods to avoid ceiling errors, which will be obvious to those skilled in the art, are available. One such method is to clip the image data at a lower value beyond where the ceiling error introduced FPN occurs and resealing the image to the desired output range, but this reduces the imager dynamic range.

The method of correcting for column fixed pattern noise (FPN) in CMOS image sensor comprising column parallel analog-to-digital converters therefore obviates or mitigates the disadvantages of previous proposals by digitally learning the FPN and subtracting this value from the image signal, and thereby removing the requirement of a frame store.

Modifications and improvements may be made to the above without departing from the scope of the present invention.

That which is claimed is:

1. A method for correcting column fixed pattern noise (FPN) in pixel image signals from an image sensor comprising an array of active pixel elements arranged in rows and columns, with at least one of the rows comprising optically masked pixels so that output image signals obtained therefrom represent a column FPN; and a respective output circuit connected to each column of the array of active pixels for reading the pixel image signals therefrom, each output circuit comprising a pair of sampling capacitors, and a sampling switch for applying pixel voltages to the pair of sampling capacitors, the method comprising:

recording the column FPN for each column from the at least one row of optically masked pixels using an image processing circuit;

recording the pixel image signals from the array of active pixels using the image processing circuit;

calculating a mean column-wise FPN from the recorded column FPN for each column using the image processing circuit; and subtracting the mean column-wise FPN column-wise from the pixel image signals using the image processing circuit;

recording the column FPN comprising operating the sampling switch for applying a value of the output image signal from the at least one row of optically masked pixels to each of the sampling capacitors, and utilizing a difference of the values of the output image signal on each sampling capacitor as the column FPN value for each column.

2. A method according to claim 1, wherein each pixel comprises a three-transistor pixel.

3. A method according to claim 1, wherein each pixel comprises a four-transistor pixel.

4. A method according to claim 1, wherein recording the column FPN further comprises filtering the column FPN to produce an estimate of the column FPN for each column.

5. A method according to claim 4, further comprising scaling the estimate of the column FPN for matching an instantaneous gain of the array of active pixel elements.

6. A method according to claim 1, wherein subtracting the column FPN further comprises clipping the pixel image signals if the pixel image signals are saturated.

7. A method according to claim 1, wherein the image sensor comprises a solid-state CMOS device.

8. A method for correcting column fixed pattern noise (FPN) in pixel image signals from an image sensor comprising an array of active pixel elements arranged in rows and columns, with at least one of the rows comprising optically masked pixels so that output image signals obtained therefrom represent a column FPN, and a respective output circuit connected to each column of the array of active pixels for reading the pixel image signals therefrom, the method comprising:

recording the column FPN for each column from the at least one row of optically masked pixels using an image processing circuit, recording the column FPN comprising filtering the column FPN to produce an estimate of the column FPN for each column;

recording the pixel image signals from the array of active pixels using the image processing circuit;

calculating a separate mean column-wise FPN from the recorded column FPN for each column using the image processing circuit;

subtracting each mean column-wise FPN column-wise from the a corresponding column of the pixel image using the image processing circuit; and scaling the estimate of the column FPN for matching an instantaneous gain of the array of active pixel elements.

9. A method according to claim 8, wherein the image sensor comprises a respective output circuit connected to each column of the array of active pixels for reading the pixel image signals therefrom, each output circuit comprising a pair of sampling capacitors and a sampling switch for applying pixel voltages to the pair of sampling capacitors; wherein recording the column FPN comprises:

operating the sampling switch for applying a value of the output image signals from the at least one row of optically masked pixels to each of the sampling capacitors;

utilizing a difference in the values of the output image signals on each sampling capacitor as the column FPN value for each column.

10. A method according to claim 8, wherein each pixel comprises a three-transistor pixel.

11. A method according to claim 8, wherein each pixel comprises a four-transistor pixel.

12. A method according to claim 8, wherein subtracting the column FPN further comprises clipping the pixel image signals if the pixel image signals are saturated.

13. An image sensor comprising:

an array of active pixel elements arranged in rows and columns, at least one of the rows comprising optically masked pixels so that output image signals obtained therefrom represent a column fixed pattern noise (FPN);

a respective output circuit connected to each column of said array of active pixels for reading pixel image signals therefrom, each output circuit comprising a pair of sampling capacitors, and a sampling switch for applying pixel voltages to said pair of sampling capacitors;

an image processing circuit for recording the column FPN for each column from said at least one row of optically masked pixels, recording the pixel image signals from said array of active pixels, calculating a mean column-wise FPN from the recorded column FPN for each column, and subtracting the mean column-wise FPN column-wise from the pixel image signals; and a timing circuit connected to said sampling switch for control thereof so that a value of the output image signals from said at least one row of optically masked pixels is applied to said pair of sampling capacitors.

14. An image sensor according to claim 13, wherein each pixel comprises a three-transistor pixel.

15. An image sensor according to claim 13, wherein each pixel comprises a four-transistor pixel.

16. An image sensor according to claim 13, wherein said image processing circuit filters the column FPN to produces an estimate of the column FPN for each column.

17. An image sensor according to claim 16, wherein said image processing circuit scales the estimate of the column FPN for matching an instantaneous gain of said array of active pixel elements.

18. An image sensor according to claim 13, wherein said image processing clips the pixel image signals if the pixel image signals are saturated.

19. An image sensor according to claim 13, wherein said array of active pixel elements, said respective output circuits and said image processing circuit are configured as a solid-state CMOS device.

20. An image sensor comprising:

an array of active pixel elements arranged in rows and columns, at least one of the rows comprising optically masked pixels so that output image signals obtained therefrom represent a column fixed pattern noise (FPN);

a respective output circuit connected to each column of said array of active pixels for reading pixel image signals therefrom; and an image processing circuit for recording the column FPN for each column from said at least one row of optically masked pixels, filtering the column FPN to produce an estimate of the column FPN for each column, recording the pixel image signals from said array of active pixels, calculating a separate mean column-wise FPN from the recorded column FPN for each column, subtracting each mean column-wise FPN from a corresponding column of the pixel image signals, and scaling the estimate of the column FPN for matching an instantaneous gain of said array of active pixel elements.

21. An image sensor according to claim 20, wherein each output circuit comprises:

at least one sampling capacitor; and a sampling switch coupled to said at least one sampling capacitor.

22. An image sensor according to claim 21, further comprising a timing circuit connected to said sampling switch for control thereof so that a value of the output image signals from at least one row of optically masked pixels is applied to said at least one sampling capacitor.

23. An image sensor according to claim 20, wherein each pixel comprises a three-transistor pixel.

24. An image sensor according to claim 20, wherein each pixel comprises a four-transistor pixel.

25. An image sensor according to claim 20, wherein said image processing circuit clips the pixel image signals if the pixel image signals are saturated.

\* \* \* \* \*

UNITED STATES PATENT AND TRADEMARK OFFICE
CERTIFICATE OF CORRECTION

| | | |
|---|---|---|
| PATENT NO. | : 7,801,384 B2 | Page 1 of 1 |
| APPLICATION NO. | : 10/841947 | |
| DATED | : September 21, 2010 | |
| INVENTOR(S) | : Keith Findlater and Angelo Bosco | |

It is certified that error appears in the above-identified patent and that said Letters Patent is hereby corrected as shown below:

Column 7, Line 43          Delete: "the a"
                           Insert: -- a --

Column 8, Line 27          Delete: "produces"
                           Insert: -- produce --

Signed and Sealed this
Fourteenth Day of June, 2011

David J. Kappos
*Director of the United States Patent and Trademark Office*